United States Patent
Ono

(10) Patent No.: US 6,802,998 B2
(45) Date of Patent: Oct. 12, 2004

(54) METHOD OF MOLDING ELASTOMERIC ARTICLE

(75) Inventor: Ryo Ono, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 330 days.

(21) Appl. No.: 09/852,681

(22) Filed: May 11, 2001

(65) Prior Publication Data

US 2001/0054782 A1 Dec. 27, 2001

(30) Foreign Application Priority Data

May 12, 2000 (JP) ........................................ 2000-140683

(51) Int. Cl.[7] ............................................... B29C 35/00
(52) U.S. Cl. ........................ 264/69; 264/315; 264/326
(58) Field of Search ............................... 264/315, 326, 264/69, 40.3, 40.6; 425/35, 44

(56) References Cited

U.S. PATENT DOCUMENTS

| | | |
|---|---|---|
| 3,362,045 A | 1/1968 | Jones-Hinton et al. |
| 3,443,280 A * | 5/1969 | Hugger ........................ 264/315 |
| 5,240,669 A * | 8/1993 | Kobayashi ................... 264/315 |
| 5,256,348 A | 10/1993 | Waller |

FOREIGN PATENT DOCUMENTS

| | | |
|---|---|---|
| EP | 0 279 081 A1 | 8/1988 |
| EP | 0 323 164 A2 | 7/1989 |
| EP | 0 323 164 A3 | 7/1989 |
| EP | 0 435 555 A2 | 7/1991 |
| EP | 0 435 555 A3 | 7/1991 |
| JP | 62-113520 A | 5/1987 |

* cited by examiner

Primary Examiner—Mathieu D. Vargot
(74) Attorney, Agent, or Firm—Birch, Stewart, Kolasch & Birch, LLP

(57) ABSTRACT

A method of molding an elastomeric article comprises: putting an elastomeric article in a mold; softening the elastomeric article in the mold by heating the elastomeric article; pressing the elastomeric article against the mold by pressurizing an inside of the elastomeric article by letting a fluid therein; and changing the pressure of said fluid in a short cycle so as to beat the elastomeric article against the mold repeatedly.

10 Claims, 5 Drawing Sheets

METHOD OF MOLDING ELASTOMERIC ARTICLE

The present invention relates to a method of molding elastomeric article.

When a pneumatic tire which is a typical elastomeric article is molded or vulcanized, conventionally, a green tire is first built and in a mold it is heated by steam under a constant pressure P1U for a predetermined time T1 and then the inside thereof is pressurized by a gas at a constant high pressure P2U for a predetermined T2 as shown in FIG. 5. By pressurizing the inside, the softened rubber is pressed against the inner surface of the mold.

However, when the inner surface of the mold is provided with relatively deep hollows for example as a negative tire tread pattern, it is difficult to fill all the corners of the hollows with rubber, and defective molding such as rubber bareness on the outer surface of the tire is liable to occur.

In general, in order to prevent rubber bareness, a large number of vent holes are provided in the hollows. Accordingly, a large number of spews of rubber are formed on the molded article. It takes a lot of time and labor to remove the spews. The time and labor may be reduced if the number of the vent holes is decreased, but rubber bareness increases.

It is therefore, an object of the present invention to provide a method of molding an elastomeric article, in which the pushing of the elastomer into hollows on the inner surface of the mold is improved to prevent the occurrence of bareness of elastomer on the surface of the molded elastomeric article and also to decrease the number of bent holes.

According to the present invention, a method of molding an elastomeric article comprises
- putting an elastomeric article in a mold,
- softening the elastomeric article in the mold by heating the elastomeric article,
- pressing the elastomeric article against the mold by pressurizing an inside of the elastomeric article by letting a fluid therein, and
- changing the pressure of said fluid in a short cycle so as to beat the elastomeric article against the mold repeatedly.

The cyclic pressure change must be carried out after the elastomeric article is softened at latest. Each cycle of the pressure change is made up of a decompression step in which the pressure decreases from a higher pressure to a lower pressure, and a subsequent repressurizing step in which the pressure increases from the lower pressure to the higher pressure. The number of cycles, namely the number of the repressurizing or decompression steps is at least two but at most about 50, usually at most about 30, preferably at most 20. The duration time of one decompression step is not more than about 60 seconds, and the duration time of one repressurizing step is also not more than about 60 seconds. If these duration times are longer than 60 seconds, the beating effect decreases, and it is difficult to prevent the bareness of elastomer.

Taking a method of vulcanizing a pneumatic tire for example, embodiments of the present invention will now be described in detail in conjunction with the accompanying drawings.

Embodiments (Tire Vulcanizing Method)

Embodiments (I) and (II) according to the present invention will now be described in detail. In each embodiment, accordingly, the elastomeric article is a pneumatic tire J, and the method of vulcanizing a pneumatic tire comprises
- a process S1 of heating the tire J up to a vulcanizing temperature by letting a heating medium 2A in the inside of the tire J which tire is disposed in a mold 3, and
- a process S2 of pressing the softened tire J against the inner surface of the mold 3 by pressurizing the inside of the tire by letting a pressurizing medium 2B in the inside of the tire J.

The heating medium 2A is a high-temperature gas having a high heat capacity. The temperature thereof is higher than the vulcanizing temperature which is usually about 140 degrees C. For instance, the heating medium 2A is a steam which is substantially saturated. The temperature thereof is about 200 degrees C. The delivery pressure PA thereof is about 1500 kPa.

The pressurizing medium 2B is a high-pressure inert gas having a low heat capacity. If it is necessary to prevent cooling down of the tire, the temperature thereof is preferably the substantially same as or higher than the vulcanizing temperature. However, as the heat capacity is low, the temperature may be lower than the vulcanizing temperature. If not necessary, the temperature may be set at a low temperature of about 40 or 50 degrees for example. The delivery pressure PB thereof is higher than the delivery pressure PA of the heating medium 2A. For instance, the pressurizing medium 2B is nitrogen gas. The temperature is about 160 degrees C. The delivery pressure PB is about 2100 kPa.

In case of a tire size for passenger cars or the like, the duration time T1 of the heating process S1 is usually about 3 to about 4 minutes, and the duration time T2 of the pressurizing process S2 is usually about 6 to about 9 minutes.

Hereinafter, the heating medium 2A and pressurizing medium 2B are generically called "fluid 2".

According to the present invention, after the tire is softened at latest, the pressure of the fluid 2 in the inside of the tire is changed in a short cycle to press the tire against the mold repeatedly.

Figure 1:
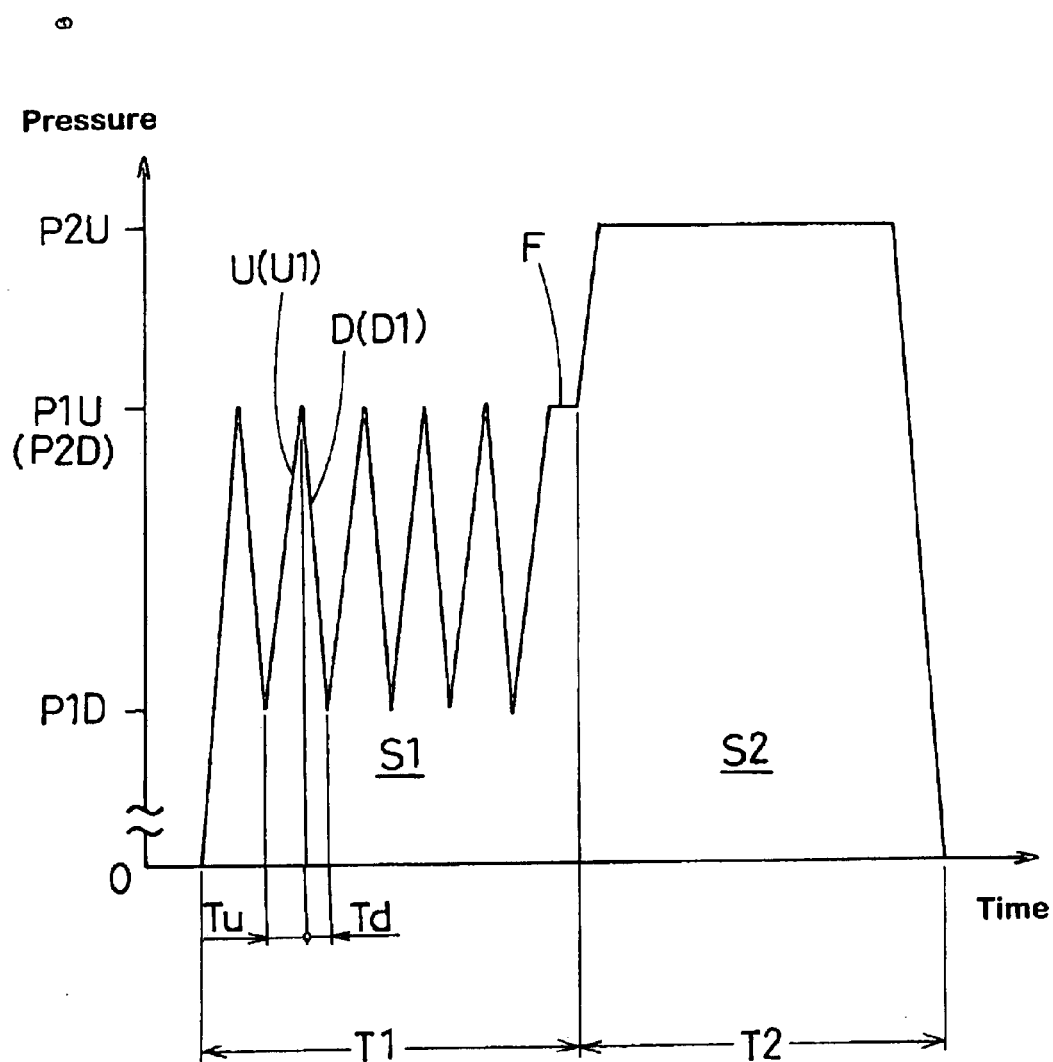
FIG. 1 is a time chart showing an example of the pressure change according to the present invention.

FIG. 1 is a chart showing a change in the pressure of the inside of the tire. In this example, the pressure is cyclically changed in the heating process S1.

Figure 2:
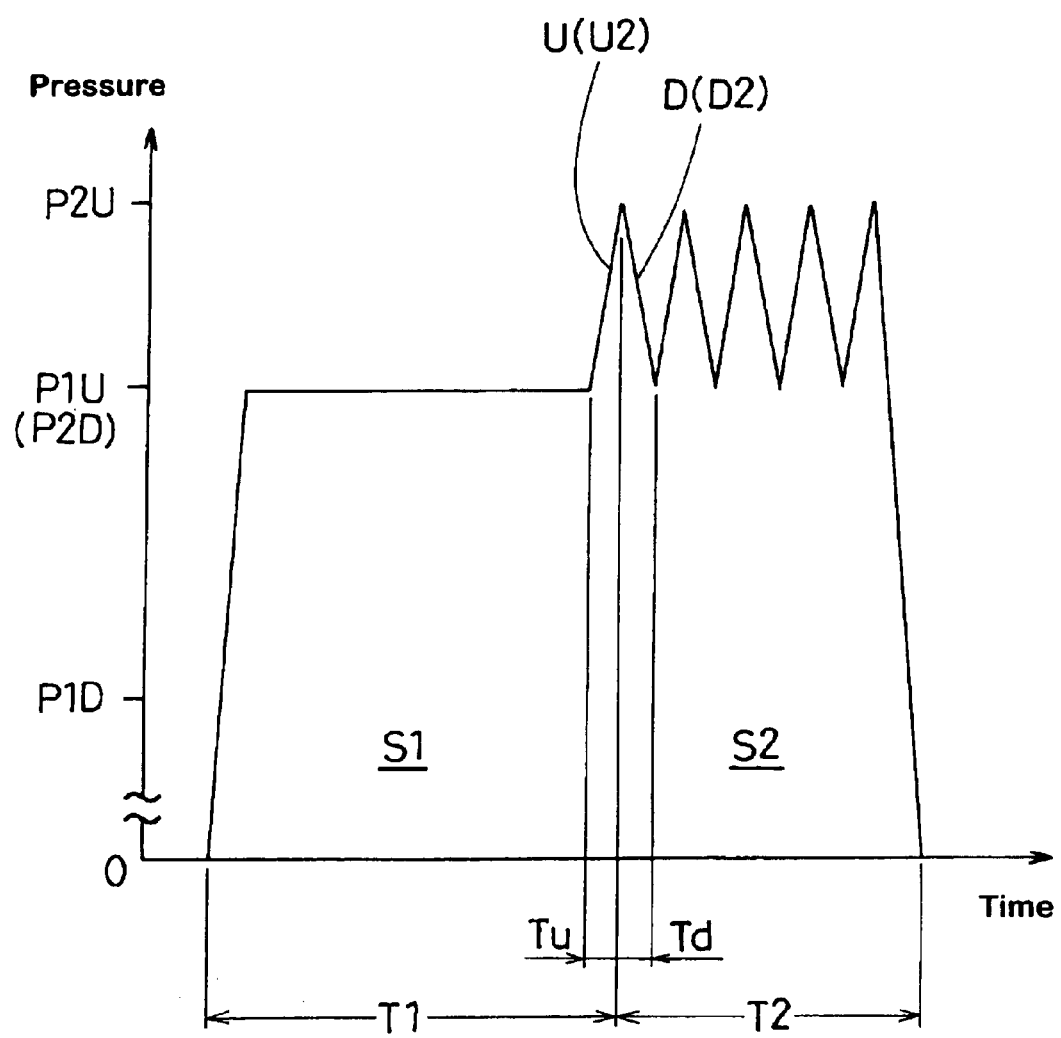
FIG. 2 is a time chart showing another example of the pressure change according to the present invention.

FIG. 2 is a chart showing another example of the change in the pressure of the inside of the tire. In this example, the pressure is cyclically changed in the pressurizing process S2.

Embodiment (I)

In FIG. 1, the pressure is first increased from the initial pressure of 0 kPa to a maximum pressure P1U. The maximum pressure P1U is that in the heating process not in the pressurizing process. This is the initial pressurizing step. Thereafter, a decompression step D1 in which the pressure decrease from the maximum pressure P1U to a lower pressure P1D, and a repressurizing step U1 in which the pressure increases from the lower pressure P1D to the maximum pressure P1U are alternately carried out.

The maximum pressure P1U is equal to the delivery pressure PA of the heating medium 2A. The lower pressure P1D is set in a range of not less than ½ times the maximum pressure P1U. However, the lower pressure P1D may be set in a range of less than ½ times the maximum pressure P1U.

In this embodiment, the duration time Td of one decompression step D1 is set in a range of not more than about 10 seconds, preferably in a range of from almost 0 (practically about 0.5 sec.) to about 4 seconds. Also, the duration time Tu of one repressurizing step U1 is set in a range of not more than about 10 seconds, preferably in a range of from almost 0 (practically about 0.5 sec.) to about 4 seconds.

The number of cycles, namely, the number Nd of the decompression steps D1 or the number Nu of the repressurizing steps U1 is set in a range of from 2 to about 20. In case of a usual tread pattern (not deep pattern), five to seven cycles may be enough for preventing the rubber bareness. Therefore, the number of cycles is preferably in a range of from 2 to 10. If the number Nu, Nd is too large, the total time T1 of the heating process S1 becomes excessively long, and there is a tendency toward over cure.

The heating process S1 may be provided before or between, preferably after the decompression/repressurizing cycles with a constant pressure step F in which the pressure is constant.

In the pressurizing process S2, on the other hand, the pressure is first increased to a maximum pressure P2U from an initial pressure in a short time. Then, the pressure is kept constant (the maximum pressure P2U) until vulcanized. Here, the initial pressure is the maximum pressure P1U in the heating process. The maximum pressure P2U is that in the pressurizing process, which is equal to the delivery pressure PB of the pressurizing medium 2B (2100 kPa in this example).

Embodiment (II)

In FIG. 2, the heating process S1 is carried out under a substantially constant pressure. That is, the pressure is increased in a short time from the initial pressure of 0 kPa to the maximum pressure P1U in the heating process. Under the maximum pressure P1U (constant pressure), the heating is continued for a predetermined time after the temperature of the tire reaches to the vulcanizing temperature.

In the pressurizing process S2, on the other hand, the pressure is first increased to the maximum pressure P2U from the initial pressure which is equal to the maximum pressure P1U in the heating process. Thereafter, a decompression step D2 in which the pressure is decreased from the maximum pressure P2U to a lower pressure P2D, and a repressurizing step U2 in which the pressure is increased from the lower pressure P2D to the maximum pressure P2U are alternately carried out. The duration time Td of one decompression step D2, the duration time Tu of one repressurizing step U2, and the number of cycles of the pressure change may be set in the same way as in the former embodiment. In this embodiment, it is preferable that the pressurizing process S2 includes a constant pressure step after the decompression/repressurizing cycles.

As another example of the tire vulcanizing method, it is also possible to change the pressure in both of the heating process S1 and pressurizing process S2.

Tire Mold

Figure 3:
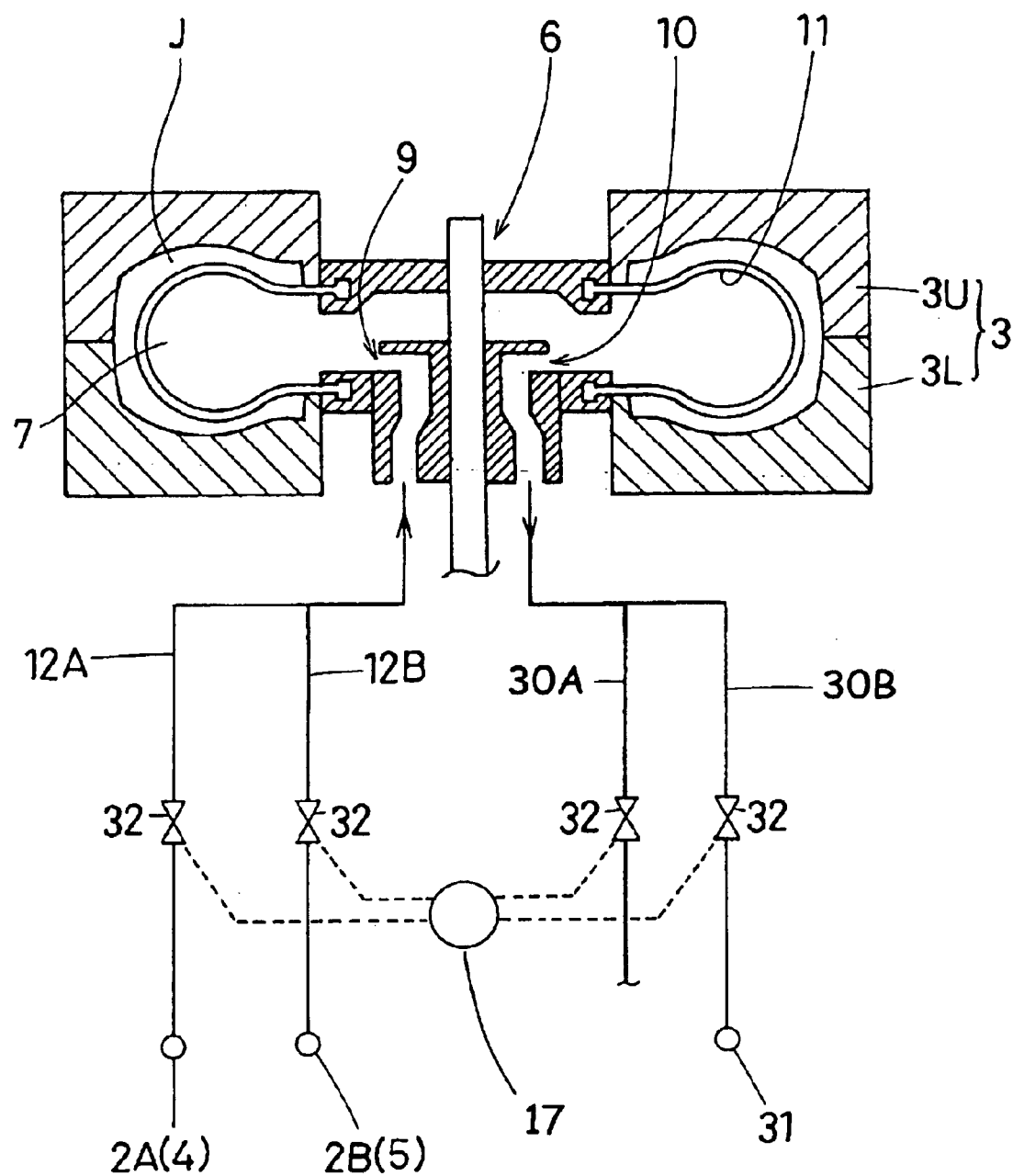
FIG. 3 is a schematic cross sectional view of a mold for vulcanizing a pneumatic tire showing an example of the piping for the heating medium and pressurizing medium.

As shown in FIG. 3, the above-mentioned tire mold 3 has a vulcanizing cavity 7 or an annular hollow in which a green tire is put. The tire mold 3 is, for example, a split mold which is split into an upper mold piece 3U and an lower mold piece 3L disposed coaxially of the tire around a central machinery 6. The central machinery 6 is provided with two ports 9 and 10 for the passage of the fluid 2. The ports 9 and 10 open towards the vulcanizing cavity 7. In this example, in order to avoid direct contact of the fluid 2 with the tire J, an expandable bladder 11 made of a rubber compound is provided therebetween. The above-mentioned heating medium 2A is led to the vulcanizing cavity 7 from a heating medium supply source 4 through a heating medium piping 12A. The pressurizing medium 2B is led to the vulcanizing cavity 7 from a pressurizing medium supply source 5 through a pressurizing medium piping 12B.

In FIG. 3, the heating medium piping 12A extending from the heating medium supply source 4 is connected to the port 9, and the pressurizing medium piping 12B extending from the pressurizing medium supply source 5 is also connected to the same port 9. But, in order to exclusively allow one of the heating medium and pressurizing medium to flow into the inside of the mold, each piping 12A, 12B is provided with a valve 32. That is, if one of them is opened, the other is closed. On the other hand, a release piping 30A for the heating medium (steam) and a release piping 30B for the pressurizing medium (nitrogen gas) are connected to the other port 10. Similarly, each piping 30A, 30B is provided with a valve 32. At the time of releasing the heating medium, the valve on the release piping 30A is opened but the other is closed. At the time of releasing the pressurizing medium, the valve on the release piping 30B is opened but the other is closed. The other end of the release piping 30B is connected to a suction pump 31 in order to exhaust the gas in order to contract the bladder 11 when the tire vulcanization is finished, and also in order to collect the gas. It is also possible to connect the other end of the release piping 30A to a suction pump in order to collect the steam and its heat. The opening and closing of these valves 32 are executed by a programmable controller 17. And the above-mentioned cyclic change in the pressure is made by the opening and closing of the valves 32.

Figure 4:
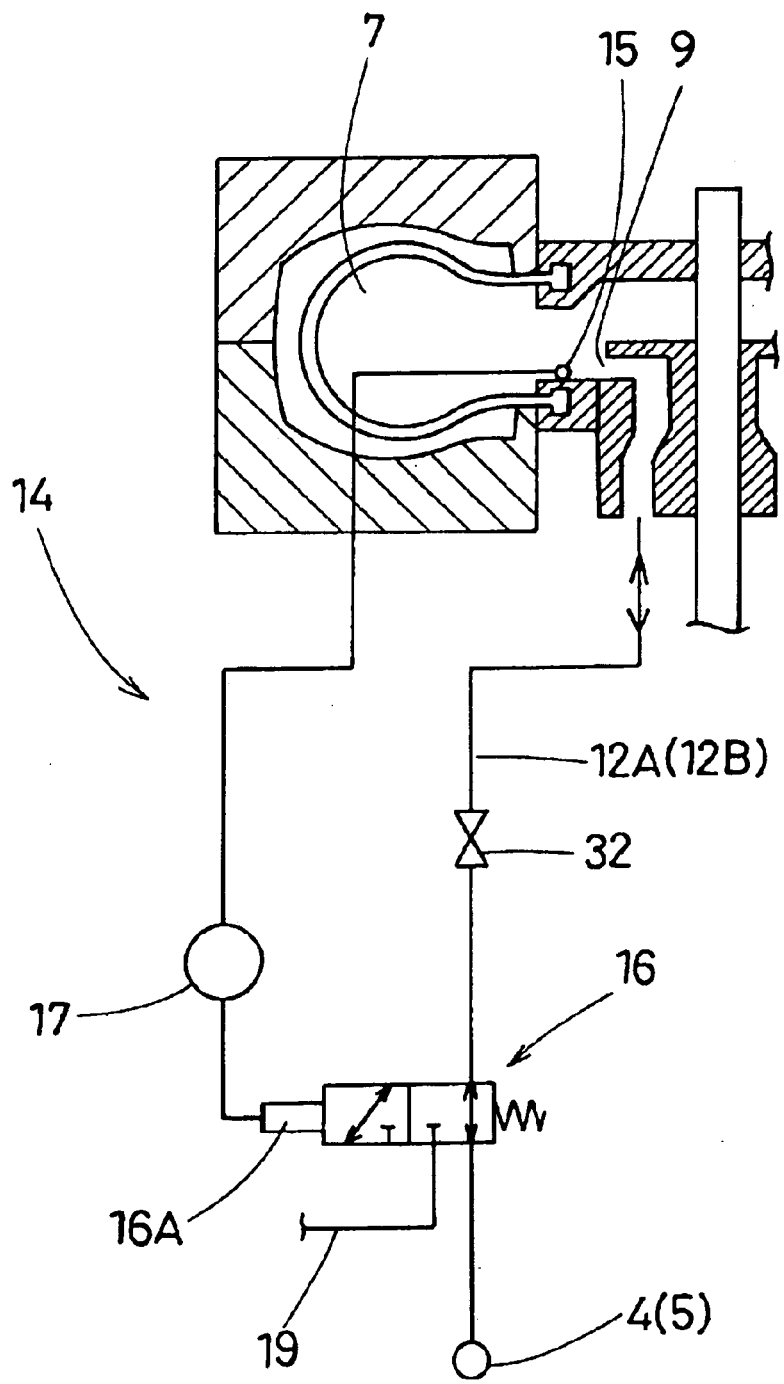
FIG. 4 is a diagram showing another example of the piping for the heating medium and pressurizing medium.

In FIG. 4 which shows another example of the fluid circuit, the release piping 30A and the release piping 30B are connected to the port 10 as shown in FIG. 3. But, the heating medium piping 12A (in case of FIG. 1) or the pressurizing medium piping 12B (in case of FIG. 2) and a further release piping 19 are connected to the port 9 through a switching valve 16 and the above-mentioned valve 32. The remainder, that is, the pressurizing medium piping 12B (in case of FIG. 1) or the heating medium piping 12A (in case of FIG. 2) is connected to the port 9 through the valve 32 in the same way as in FIG. 3. The opening and closing of the valves 32 and the switching of the valve 16 are executed by a programmable controller 17. In this example, the above-mentioned cyclic change in the pressure is made by the switching of the valve 16, namely, the switching of the connection of the port 9 between the medium piping (12A, 12B) and the release piping 19.

The programmable controller 17 operates the valves 32, 16 according to the outputs of various sensors such as a sensor 15 for the pressure in the vulcanizing cavity 7, a sensor for the temperature and the like, and an internal clock, following a stored program which realizes the timetable shown in FIG. 1 or FIG. 2. The temperature sensor 15 is disposed on the mold and used to detect conditions that the pressure reaches to a) the maximum pressure P1U or the lower pressure P1D in case of FIG. 1, or b) the maximum pressure P2U or the lower pressure P2D in case of FIG. 2.

By the way, in any embodiment, a process of releasing the pressurizing medium, a process of taking out the tire from the mold, etc. follow after the pressurizing process S2.

Comparison Test

Green tires (Tire size 225/40ZR18) were made and vulcanized using the same mold but different time charts shown in Table 1. And a visual external examination on rubber bareness on the outer surface of the tire, and a cut-open inspection for adhesive failure between laminated layers, namely the inner liner and carcass ply, etc. due to residual air therebetween were made to obtain the rate of defective moldings. The results are also show in Table 1.

TABLE 1

Figure 5:
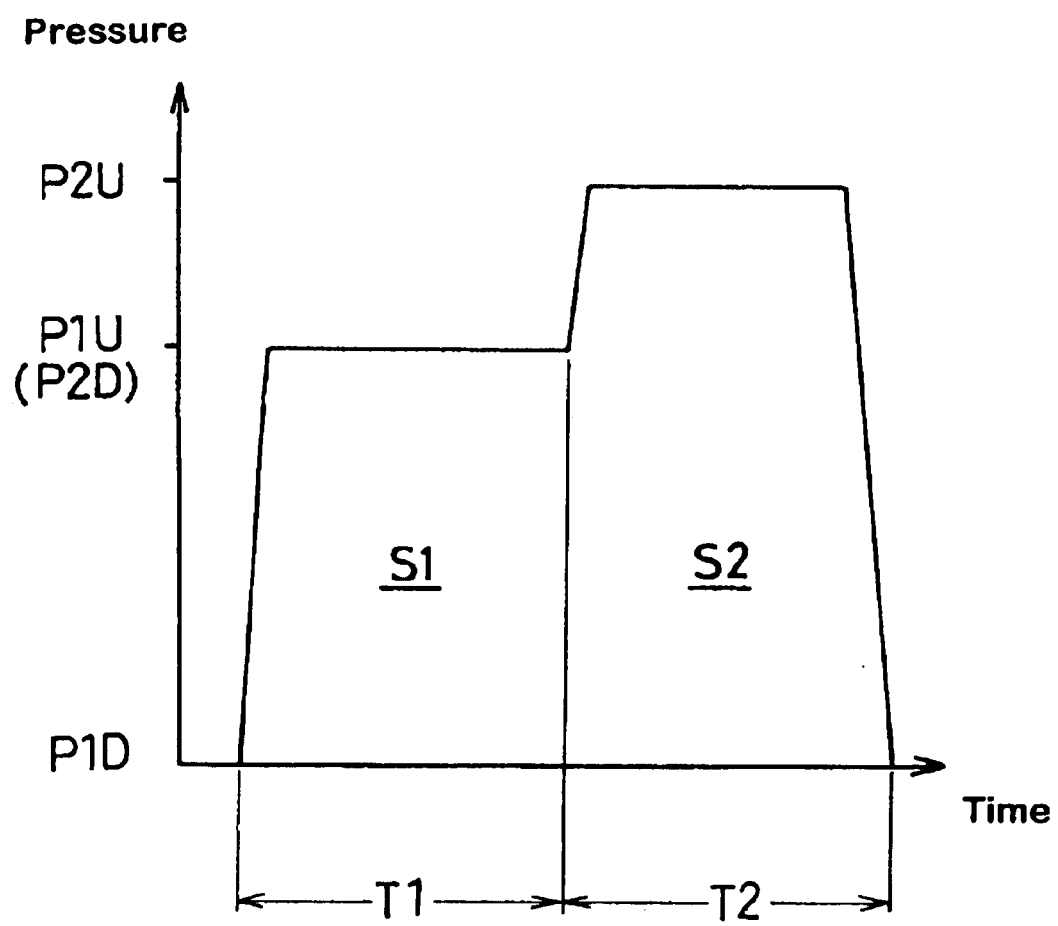
FIG. 5 is a time chart showing a pressure change employed in the under-mentioned comparison test.

| Molding | Ref. | Ex. 1 | Ex. 2 |
|---|---|---|---|
| Pressure chart type | FIG. 5 | FIG. 1 | FIG. 1 |
| Heating process S1 | | | |
| Total time T1 | 3'00" | 5'30" | 3'00" |
| Pressure | constant | variable | variable |
| Maximum pressure P1U (kPa) | 1500 | 1500 | 1500 |
| Lower pressure P1D (kPa) | — | 500 | 1000 |
| Pressurizing steps | | | |
| Number Nu*1 | 1 | 6 | 7 |
| Time Tu (sec.) | 30 | 30 | 2 |
| Decompression steps | | | |
| Number Nd | 0 | 5 | 6 |
| Time Td (sec.) | — | 30 | 2 |
| Heating medium | steam | steam | steam |
| Temperature (deg. C.) | 200 | 200 | 200 |
| Delivery pressure PA (kPa) | 1500 | 1500 | 1500 |
| Pressurizing process S2 | | | |
| Total time T2 | 5'00" | 3'00" | 3'00" |
| Pressure | constant | constant | constant |
| Maximum pressure P2U (kPa) | 2100 | 2100 | 2100 |
| Pressurizing steps | | | |
| Number Nu*1 | 1 | 1 | 1 |
| Time Tu (sec.) | 15 | 15 | 15 |
| Decompression steps | | | |
| Number Nd*2 | 0 | 0 | 0 |
| Time Td (sec.) | — | — | — |
| Pressurizing medium | N | N | N |
| Temperature (deg. C.) | 40 | 40 | 40 |
| Delivery pressure PB (kPa) | 2100 | 2100 | 2100 |
| Rate of defective moldings (%) | 20 | 0 | 0 |

*1 including the initial pressurizing step
*2 not including the last decompression step As described above, in the tire vulcanizing methods according to the present invention, the short-cycle pressure change can beat the elastomer repeatedly against the inside of the mold. As a result, the elastomer is pushed in the hollows on the inner surface of the mold, and at the same time, the air trapped between the elastomeric article and the mold can be removed. Therefore, the occurrence of bareness of the elastomeric material can be effectively prevented. Further, the air trapped between laminated layers such as an inner liner and a carcass ply during tire building processes can be also removed to prevent adhesive failures.

As described above, the present invention suitably applied to a pneumatic tire as a vulcanizing method therefor. But, it can be applied to elastomeric articles having unevenness on the outer surface and a hollow which the fluid can be let in.

What is claimed is:

1. A method of molding an elastomeric article comprising
putting an elastomeric article in a mold,
softening the elastomeric article in the mold by heating the elastomeric article,
pressing the elastomeric article against the mold by pressurizing an inside of the elastomeric article by introducing a fluid therein, and
changing the pressure of said fluid in a short cycle so as to beat the elastomeric article against the mold, wherein
said fluid is a heating medium which is introduced into the inside of the elastomeric article to heat the elastomeric article,
the pressure is changed at least two cycles between a maximum pressure P1U for the process of heating the elastomeric article and a lower pressure P1D less than the maximum pressure P1U but not less than ½ times the maximum pressure P1U, and
one cycle of the change in the pressure comprises a decrease of short duration of not more than 10 seconds and an increase of short duration of not more than 10 seconds.

2. A method of molding an elastomeric article comprising
putting an elastomeric article in a mold,
softening the elastomeric article in the mold by heating the elastomeric article,
pressing the elastomeric article against the mold by pressurizing an inside of the elastomeric article by introducing a fluid therein, and
changing the pressure of said fluid in a short cycle so as to beat the elastomeric article against the mold, wherein
said fluid is a pressurizing medium which is introduced into the inside of the elastomeric article to pressurize the inside of the elastomeric article,
the pressure is changed at least two cycles between a maximum pressure P2U for the process of pressurizing the elastomeric article and a lower pressure P2D less than the maximum pressure P2U, and
one cycle of the change in the pressure comprises a decrease of short duration of not more than 60 seconds and an increase of short duration of not more than 60 seconds.

3. A method of molding an elastomeric article comprising
putting an elastomeric article in a mold,
softening the elastomeric article in the mold by heating the elastomeric article,
pressing the elastomeric article against the mold by pressurizing an inside of the elastomeric article by introducing a fluid therein, and
changing the pressure of said fluid in a short cycle so as to beat the elastomeric article against the mold, wherein
said fluid is a heating medium which is introduced into the inside of the elastomeric article to heat the elastomeric article and
a pressurizing medium which is introduced into the inside of the elastomeric article to pressurize the inside of the elastomeric article,
the pressure of the heating medium is changed at least two cycles between a maximum pressure P1U for the process of heating the elastomeric article and a lower pressure P1D less than the maximum pressure P1U but not less than ½ times the maximum pressure P1U, wherein one cycle of the change in the pressure comprises a decrease of short duration of not more than 60 seconds and an increase of short duration of not more than 60 seconds, and
the pressure of the pressurizing medium is changed at least two cycles between a maximum pressure P2U for the process of pressurizing the elastomeric article and a lower pressure P2D less than the maximum pressure P2U, wherein one cycle of the change in the pressure comprises a decrease of short duration of not more than 60 seconds and an increase of short duration of not more than 60 seconds.

4. The method according to claim 1, 2 or 3, wherein the number of cycles of the change in the pressure is at most fifty.

5. The method according to claim 1, 2 or 3, wherein
the number of cycles of the change in the pressure is at most twenty.

6. The method according to claim 1, 2 or 3, wherein
the number of cycles of the change in the pressure is at most ten.

7. The method according to claim 1, 2 or 3, wherein
said elastomeric article is a pneumatic tire.

8. The method according to claim 2 or 3, wherein
one cycle of the change in the pressure comprises a decrease of short duration of not more than 10 seconds and an increase of short duration of not more than 10 seconds.

9. The method according to claim 1, or 3, wherein
the heating medium is a gas having a high heat capacity, and the pressurizing medium is an inert gas having a heat capacity lower than the heat capacity of the heating medium.

10. The method according to claim 1 or 3, wherein
in the process of heating the elastomeric article by the heating medium, after the cyclic change in the pressure of the heating medium is made, the pressure is kept substantially constant for a certain length of time.

* * * * *